Dec. 17, 1957   M. MAUL   2,816,706
RECORD CARD CONTROLLED SUMMARY PUNCH
Filed March 10, 1954   5 Sheets-Sheet 1

Inventor:
Michael Maul
BY

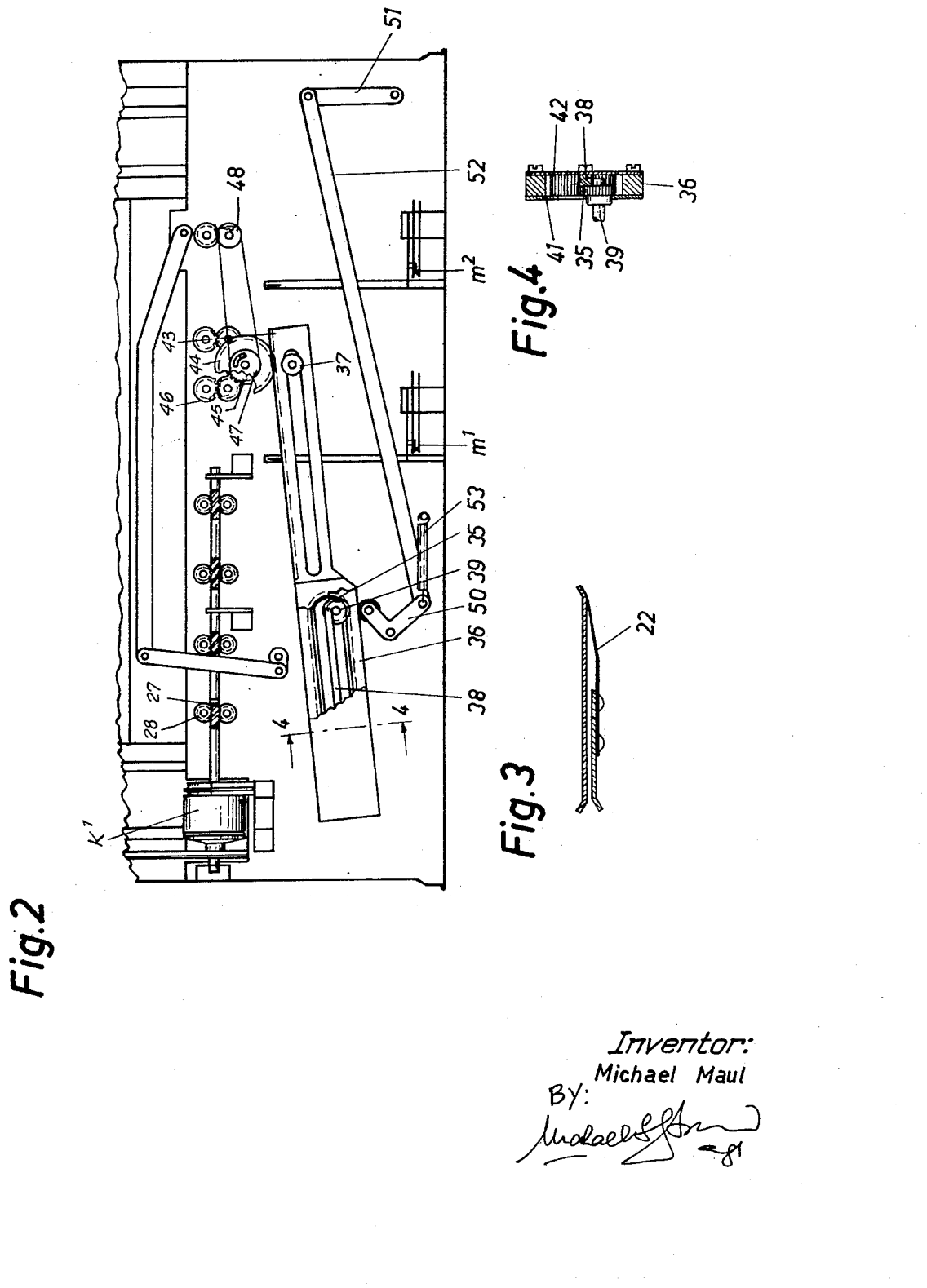

Dec. 17, 1957 M. MAUL 2,816,706
RECORD CARD CONTROLLED SUMMARY PUNCH
Filed March 10, 1954 5 Sheets-Sheet 3

Inventor:
Michael Maul

Dec. 17, 1957    M. MAUL    2,816,706
RECORD CARD CONTROLLED SUMMARY PUNCH
Filed March 10, 1954    5 Sheets-Sheet 5

Inventor:
Michael Maul
BY:

United States Patent Office 2,816,706
Patented Dec. 17, 1957

2,816,706

RECORD CARD CONTROLLED SUMMARY PUNCH

Michael Maul, Schwabach, near Nurnberg, Germany

Application March 10, 1954, Serial No. 415,405

Claims priority, application Germany March 27, 1953

17 Claims. (Cl. 235—61.1)

The present invention relates to a record card controlled machine of the type generally known as "summary card punch." This type of machine may be so constructed that a punching device is operatively connected to a tabulating machine, or in such manner that in an independent punching machine the data of the item cards running through the machine are merely computed and that for each card group a summary card is punched. Therefore, generally speaking, the invention relates to a machine wherein the items of item cards running through the machine are computed in accumulators and wherein at the end of a group of item cards a summary card is punched under the control of the accumulators by means of a punching mechanism.

In the known machines of this type the group designation, which must be available for identification of the total, is taken upon summary card punching from a store into which the group designation is entered during the passage of the first item card of each group. As a storage device serves for instance as an accumulator, accordingly, the group designation is available at the same time as with the total data and is punched simultaneously with the total. It is of subordinate importance whether punching of the summary card is effected consecutively column by column, hole position by hole position in all columns simultaneously, or whether punching is effected in all positions of all columns in a single punching operation.

According to the present invention punching of the group designation and of the total in two consecutive punching operations is so effected that upon analysis of the first item card of a group the punching mechanism punches the group designation into the summary card immediately under the control of the group field of the item card without applying group designation stores, and that upon total taking the total data field is punched according to the setting of the accmulators.

This division of the punching of the summary card into two separate punching operations, of which one coincides with the analysis of the first card and is immediately effected from the latter while the second punching operation coincides with the total taking, permits the elimination of group stores. Particularly, the use of accumulators for group data storing is avoided and thereby the capacity with regard to accumulators is increased in a machine being otherwise of the same size. The advantages of the invention will become particularly obvious if the group designations do not consist of numerals but also include alphabetical data (such as for instance names, material designations etc.). If one would attempt to store the group designations consisting of alphabetical characters, extraordinarily bulky stores would be required for this purpose since for instance the setting to one character of the alphabet requires at least a storing element having 26 different setting possibilities.

The advantages of the invention will become particularly obvious if a punching machine is used having only a single row of punches comprising one punch for each perforation column and permitting the simultaneous punching of the adjacent perforation columns position by position. In a machine being equipped in such way, according to the invention the card is moved twice by a shifting device under the row of punches, the first movement (group perforation run) being effected synchronously with the passage of the first card of a group past the analyzers while at the same time the punches are controlled by the group designation field of the card, and the second movement (total punching run) taking place upon total taking in synchronism with the analysis of the setting of the accumulators while the punches are controlled in accordance with the accumulator mechanism setting.

The idea according to the invention may be embodied in different constructions. In the construction provided only with a single row of punches for all perforation columns (and accordingly with a single analyzer for each perforation column), the card may be fed in the group punching run at first past the stationary row of punches while in the total punching run the row of punches may be shifted position by position with respect to a stationary card. In the preferred embodiment which is described hereafter, the card is fed in the group punching run position by position past a stationary row of punches. After group punching has been completed the card remains at rest until total taking takes place whereupon the card is shifted backwards past the same row of punches and is punched in agreement with the analysis of the accumulator setting. The invention will be best understood from the following description of a specific embodiment, when read in connection with the accompanying drawings.

Fig. 2 is a rear view of the machine particularly illustrating the reversing gear for the summary card feed.

Fig. 3 shows the card deflector provided in the summary card path for diverting the summary card into the card receiver.

Fig. 4 shows a section through the reversing gear according to sectional line 4—4 of Fig. 2.

Figure 1:
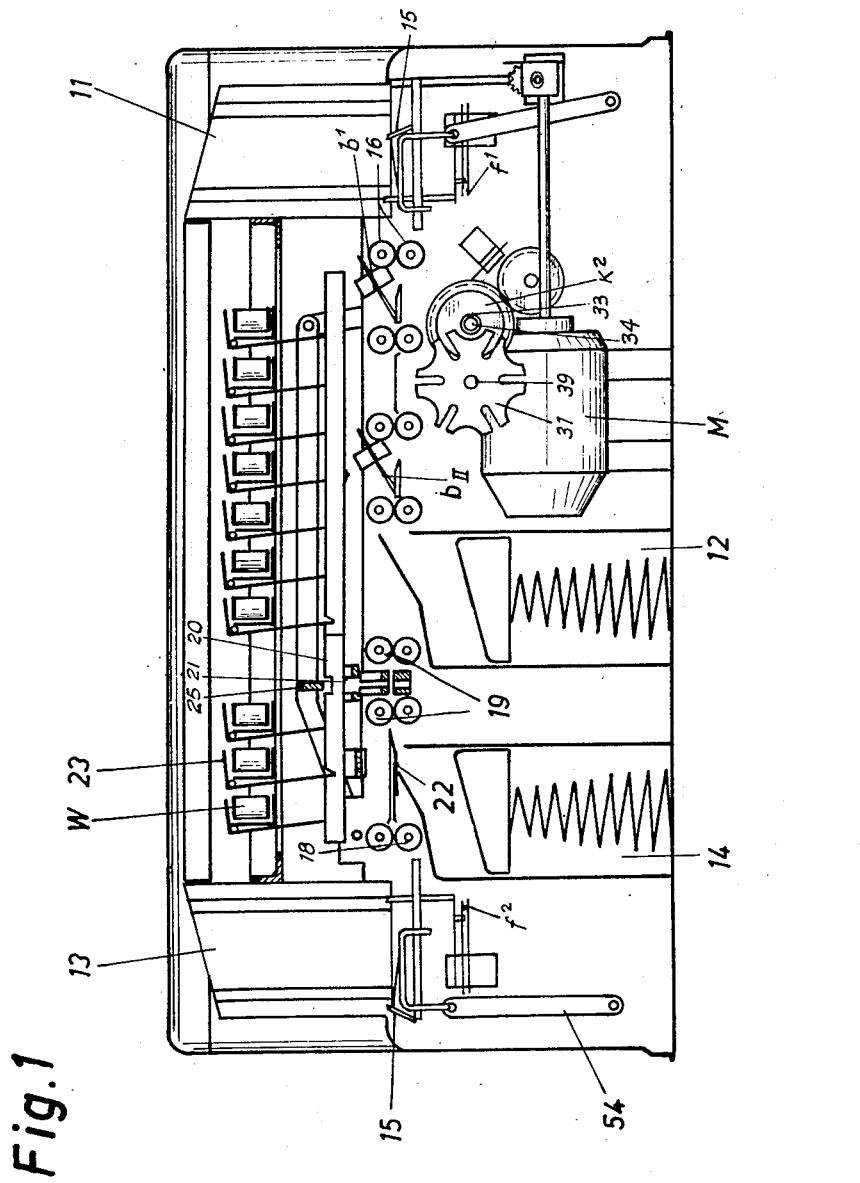
Fig. 1 shows a longitudinal section through the machine.

The machine is operating upon cards as they are generally used in the Hollerith-machines. The perforations in the card are effected according to the so called single hole system. The perforations representing alphabetical characters are moreover designated by a special overpunched hole. Sensing is effected row by row, index position by index position.

In the right hand magazine 11 (Fig. 1) item cards sorted according to groups are inserted. The items of these cards have to be added. In the left hand magazine 13 blank cards are inserted into which the respective total of the various groups as well as the designation (for instance name and group number) are punched.

From the magazine 11 the item cards are fed to the feed rollers 16 by means of the card knife 15. The rollers feed the cards under the analyzing brushes $b_I$ and $b_{II}$. Subsequently the cards are deposited in the pocket 12. The brushes $b_I$ serve together with the brushes $b_{II}$ for the group control. The brushes $b_{II}$ also have to direct the amount entries in the various cards to the accumulators and moreover to direct the group designations to the punching mechanism. At the beginning of each group a blank card is fed by means of the feed rollers 18 and 19 from the magazine 13 to the punching device. Simultaneously with the passage of the first item card of a group on $b_{II}$ a blank card is fed synchronously therewith under the punches 21. During this operating cycle, transfer of the designation data of the first item card is effected to the blank card. The punching having been completed, the blank card which has been just punched is held stationary to the right of the punches (Fig. 1) whereas the item card feed is not interrupted so that now the following item cards are successively analyzed and the amount data are entered into the accumulators. If a change of the group number is determined in the sequence of the item cards, the item card feed is stopped at the end of this operating cycle and instead thereof the blank card, prepunched with the group designation, is moved backwards under the punches 21. Synchronously therewith the analysis of the accumulators and the respective control of the punching mechanism are effected so that the total is punched into the card. On its return movement the card is diverted from its path by the deflector 22 (Figs. 1 and 3) and is deposited into the pocket 14 after punching.

The drive of the feeding devices as well as of the punching mechanism is effected from the motor M. The latter drives through gears the magnet clutch $K^1$ (Fig. 2) which connects the worm shaft 27 with the drive. The worm shaft 27 drives the worm wheels 28, which are mounted on the same shafts as the feed rollers 16 for the item card feed. Consequently, as long as the magnet clutch $K^1$ is energized, the item cards are fed constantly at the same speed under the analyzing brushes $b_I$ and $b_{II}$.

The drive of the blank cards and the summary cards, respectively, on the other hand is effected step by step by the Geneva drive 31. Between the Geneva drive 31 and the motor, a magnet clutch $K^2$ is arranged which upon energization connects the continuously rotating shaft 34 with the sleeve 33. On the sleeve 33 is fixed the drive disk of the Geneva drive, said disk being not shown. The Geneva wheel 31 is rigidly mounted on the shaft 39 which carries the gear 35 (Figs. 2 and 4). The gear 35 engages a plate 36 toothed on the inside which serves as reversing gear. The plate 36 is freely movable and is only held by the gear 35 and the guide 37. In order to avoid disengagement between the gear 35 and the gearing of the plate 36, a bar 38 is provided on which slides the end of the shaft 39. Moreover, on the plate 36 there are provided two plates 41 and 42 which prevent lateral sliding off.

Upon step by step turning of the gear 35 the plate 36 is moved to the right or to the left (Fig. 2). On the straight line the transfer of the stepwise movement is effected uniformly. The unequal transfer at the dead centres does not interfere with the card feed since during this time punching is not effected. The reciprocating movement of the plate 36 is transmitted by means of the gearing 43 to the gear 44 and from the latter through the gear 45 to the gears 46. The latter are seated on the same shaft as the rollers 19 which feed the blank card under the punches. Upon movement of the reversing gear to the left (Fig. 2) the card is fed below the punches to the right (Fig. 1), whereupon punching of the designation data is then effected. If the reversing gear moves to the right (Fig. 2), the card is fed to the left (Fig. 1), and punching of the total then takes place. The exact timing of the engagement and disengagement of this reversing gear and the timing of the summary card feed will be referred to once more later on in the description of the wiring. One reciprocating movement of the reversing gears corresponds to 43 steps of the Geneva drive.

Beside the gear 44 there is provided the pulley 47 which is driven by the gear 44 through a lost-motion connection so that the pulley 47 only turns during a part of the revolution of the gear 44. The pulley 47 drives the pulley 48 through which the drive of the rollers 18 is effected. Between the pulley 48 and the rollers 18 there is provided a slip clutch which is not illustrated. The ratio of the rollers 18 with respect to the rollers 19 is so chosen that the card, which is fed by the rollers 18, reaches the rollers 19 before the latter are able to release the preceding card. Moreover, the arrangement of the gears is such that the direction of rotation of the rollers 18 is always opposite to the direction of rotation of the rollers 19. If a card is fed back by the rollers 19, consequently at the same time another card is fed by the rollers 18 to the punching device. The card between the rollers 18, however, cannot be fed further until it contacts the rollers 19, since the latter rotate in opposite direction and can therefore only receive the card upon change of their rotating direction. Before the change of the rotating direction, the preceding card has, however, left the rollers 19 and has been deposited in the pocket 14. When the rollers 19 now change their rotating direction, they grip the following card and feed the latter to the punching device. On account of the lost motion, the rollers 18 are stationary for one moment and then start to rotate in opposite direction. In the meantime the card has, however, already left the rollers 18.

The reversing gear serves also for the drive of the card knife 15 below the magazine 13 for the blank cards. To the plate 36 there is attached a bell crank lever 50 which is connected with the arm 51 through a rod 52. The spring 53 urges the bell crank lever always against the plate 36. In accordance with the up- and down-movement of the reversing gear, the bell crank lever 50 is rocked back and forth and transfers its rocking movement to the arm 51 by means of the rod 52. The arm 51 is firmly seated on the same shaft as the arm 54 (Fig. 1) which engages a knife carrier. The knife 15 therefore always moves one card at a time out of the magazine 13 when the reversing gear is pressed downwardly in its left position (Fig. 2).

The control of the punching device is effected by means of the punch selector magnets W. When one of the latter is energized it attracts its armature 23 which moves its associated selector bar 20 to the left (Fig. 1). Thereby the full depth of the selector bar arrives under the punching yoke 25, which upon its downward movement takes along the selector bar 20 and therewith also the associated punch 21 and presses the punch through the card. The drive of the punching yoke is effected from the motor.

Figure 5:
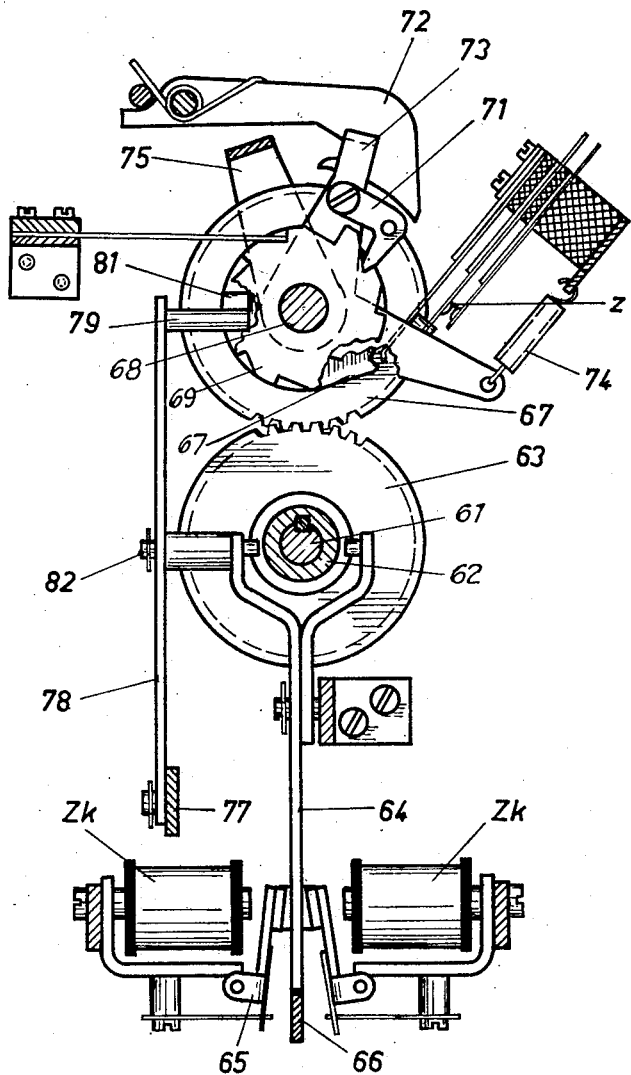
Fig. 5 shows the section through an accumulator as it may be used in the summary punch according to the invention.
Figure 6:
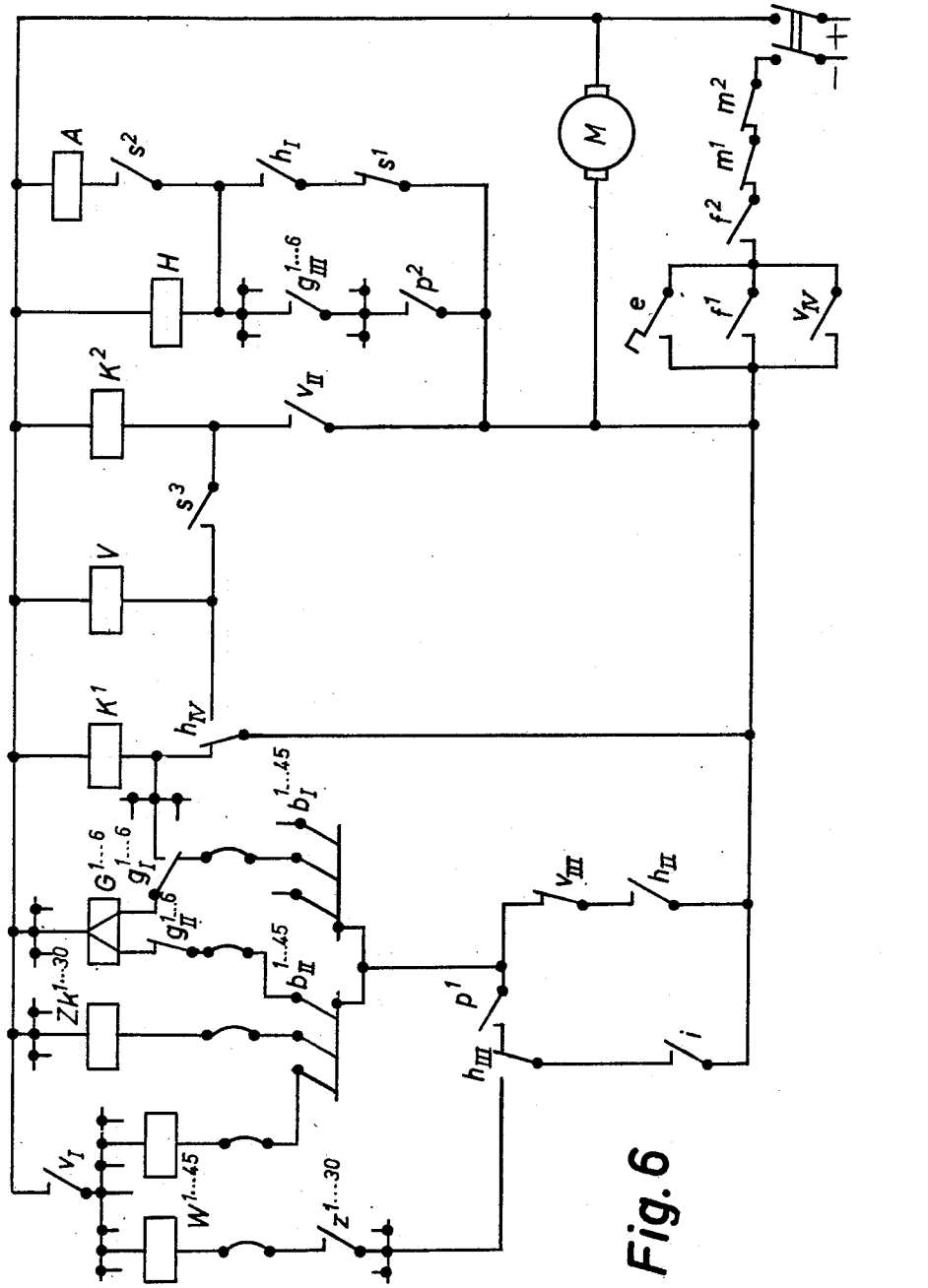
Fig. 6 is the wiring diagram of the machine.

For the sake of clarity, an accumulator will be briefly described which may be used for the machine described herein. It is an accumulator of the type used for instance in the known Hollerith machines. The shaft 61 (Fig. 5) rotates uniformly in counterclockwise direction synchronously with the card movement. On the shaft 61 the clutch 62 is mounted for axial movement while being held against rotation relative to the shaft. The clutch 62 is held disengaged from the gear 63 by the lever 64, said gear being freely rotatable on shaft 61 but held against axial movement thereon. When one of the accumulator magnets $Zk$ is energized it attracts its armature 65, thereby releasing the blocked lever 64 and causing the clutch 62 to be pressed by a spring against the gear 63. Energization of the magnet $Zk$ depends upon whether the associated brush $b_{II}$ encounters a hole in the card and thereby closes the circuit through the magnet. When the analysis of a card is finished all released levers 64 are again restored to their initial position by means of the bar 66 and thereupon the clutches are disengaged.

The rotating movement of the gear 63, thus effected, is transferred to the gear 67. The gear 67 is connected to a ratchet wheel 69 and is rotatably mounted upon the shaft 68. Ratchet wheel 69, the pawl 71, the levers 72, 73, the spring 74 and yoke 75 serve in a known manner for the tens transfer.

If the setting of the accumulator is to be analyzed, at the beginning of the analysis all magnets $Zk$ are simultaneously energized and therewith all accumulator elements are engaged. According to the position of the various accumulator elements, the cam 76 actuates at different times the contact $z$, which feeds an impulse to the punch selector magnets W. The impulse emission is effected complementally to the setting of the accumulators since the rotating direction is not changed upon analyzing. The complemental analysis corresponds to the return movement of the card to be punched so that the latter is punched with the real values. In accordance with the "Hollerith" code, a complemental value, sensed in reverse direction, produces punching of the real value.

If the accumulator is to be zeroized the rod 77 is moved perpendicularly to the plane of the drawing by a magnet A which is not illustrated herein, so that the lever 78 is rocked and its pin 79 arrives in the path of the cam 81. If all accumulator elements are engaged for zeroizing, the accumulator elements rotate until the cam 81 passes the pin 79 and pushes the latter out of its path. The rocking movement of the lever 78, thus effected, is transferred by means of the pin 82 to the clutch lever 64 which shifts the clutch 62 to the disengaged position.

*Wiring*

Figure 7:
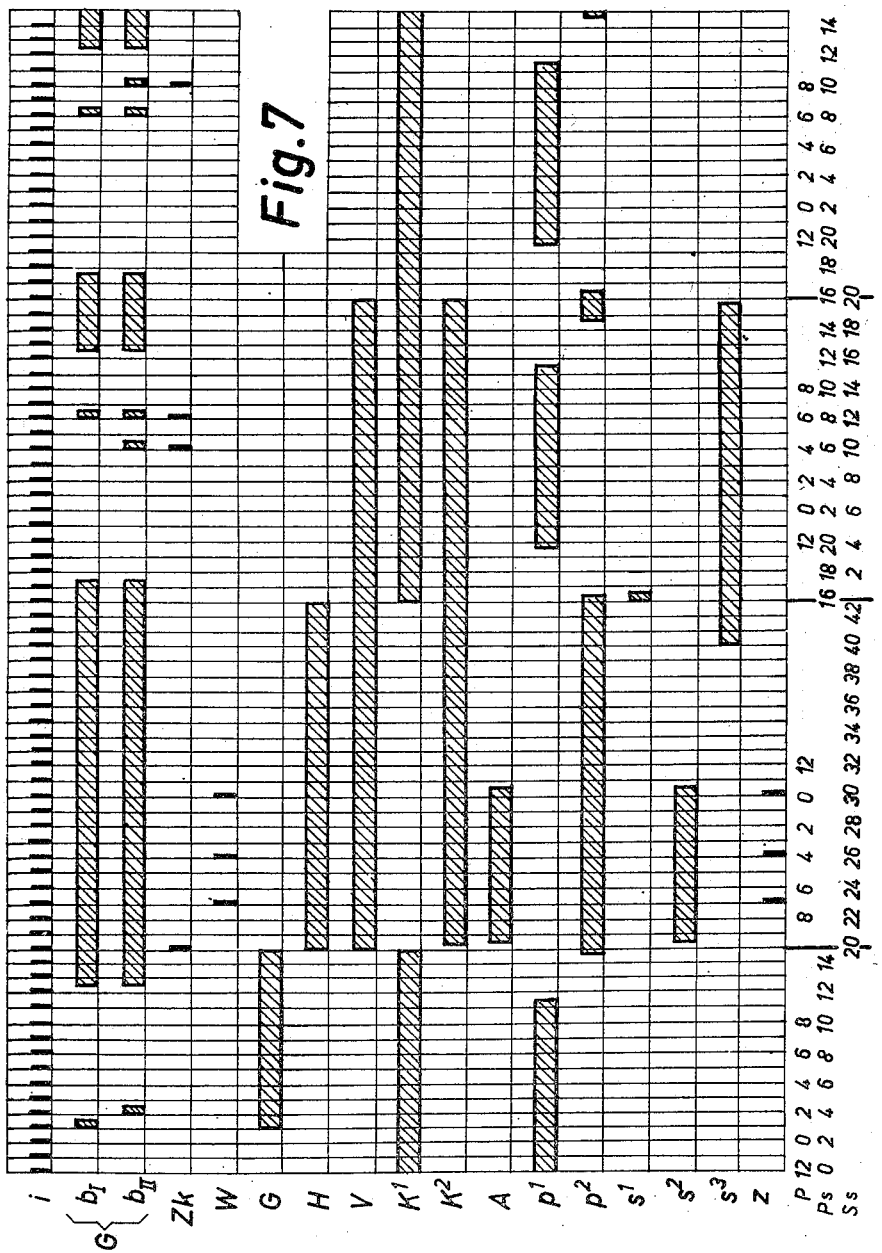
Fig. 7 is the relay- and cam-diagram of the machine.

In the illustration of the wiring for the summary punch a simplified method has been chosen, as generally used in the art of communication. In order to facilitate reading of the wiring diagram, Fig. 7 shows the relay- and cam-diagram. It indicates the responding and closing times, respectively, of the relays and cam contacts, depending on the card movement. The indication $p$ indicates contacts which are actuated by cams running synchronously with the item card movement and $s$ indicates the contacts which are actuated by cams rotating synchronously with the summary card movement. One division in the diagram corresponds to one step of a card. In order to simplify the general view of the card movement, in the lower three lines are indicated the steps of the individual cards and the positions, respectively, which are under the analyzing or the punching device. In the line P there are indicated the positions of the item and summary cards, respectively, which at this time are under the analyzing or the punching device. In the line P$s$ are shown the steps of the item cards and in the line S$s$ the steps of the summary cards. In order to permit provision of the numbers, only every second position or every second step has been designated by a number. The following sequence has been chosen as an example for the diagram: The last item card of a group is analyzed; subsequently the total is punched into the summary card belonging to this group. This operation is followed by the analysis of the first item card of the next group. At the same time the group number is transferred and punched into a blank card, whereupon then analysis of the next item card takes place. The specification departs somewhat from the example in the diagram in order to show the begin of the card run in the machine. The departure concerns here only the lines for the analyzing brushes $b_\mathrm{I}$ and $b_\mathrm{II}$ as well as that of the accumulator clutch magnet $Zk$. All other lines are alike in the diagram as well as in the specification.

If the supply magazines are filled with cards the two contacts $f^1$ and $f^2$ are closed. When the machine is now switched on, the motor M receives current from negative through the contacts $m^2$, $m^1$ and $f^2$, $f^1$ so that the machine starts running. The contact $f^1$ is actuated if there are cards in the magazine 11 and the contact $f^2$ is actuated if there are cards in the magazine 13. The contacts $m^1$ and $m^2$ are opened if the card receivers 12 or 14 are filled with cards. Moreover, current flows from the contact $f^1$ through the contact $h_\mathrm{IV}$, through the magnet clutch $K^1$ to positive, so that the latter responds and shifts the card feed for the item cards. Now, the first item card is fed to the analyzing brushes $b_\mathrm{I}$. During the operating cycles which take place in this interval, the brushes are still on the contact plate so that the latter, as soon as the cam contacts $i$ and $p^1$ are closed, direct the current to the group control relay G and to the accumulator clutch magnet $Zk$. The group control relays G are constructed as differential relays and do not respond in this instance since current flows simultaneously through both windings. Responding of the accumulator clutch magnets has no influence since the accumulator is again zeroized before analysis of the first card, as will be still shown below.

If the first card has reached the analyzing brushes $b_\mathrm{I}$ the brushes $b_\mathrm{I}$ are lifted from the contact plate by the card. The current does no longer flow through both windings of the group control relays G but only through the brushes $b_\mathrm{II}$ and the contacts $g_\mathrm{II}$ through the left winding to positive so that according to the perforation in the first item card one or several of the group control-relays respond and actuate their contacts $g_\mathrm{I}$, $g_\mathrm{II}$ and $g_\mathrm{III}$.

The contact $g_\mathrm{I}$ shifts and therewith establishes a holding circuit for the energized group control relay G. The contact $g_\mathrm{II}$ interrupts the current circuit to the second winding of the group control relay. Current flows from negative through the contacts $m^1$, $m^2$, $f^2$, $f^1$, $h_\mathrm{IV}$, $g_\mathrm{I}$ through one or several group control relays G to positive. The contact $g_\mathrm{III}$ is closed and prepares the current circuit for the auxiliary relay H which has the task to initiate transferring from the first item card to the summary card.

When the first item card has been fed under the brushes $b_\mathrm{I}$ and is shortly before the brushes $b_\mathrm{II}$ the cam contact $p^2$ is closed (corresponding to step 15 in the diagram, Fig. 7). Since the contacts $g_\mathrm{III}$ have been closed beforehand, current may flow from the contact $f^1$ through the contacts $p^2$, $g_\mathrm{III}$, through the relay H to positive. The latter responds and actuates its contacts $h_\mathrm{I}$ to $h_\mathrm{IV}$. The contact $h_\mathrm{I}$ is closed and establishes a holding circuit to the relay H. Current flows from the contact $f^1$ through the contacts $s^1$, $h_\mathrm{I}$ through the relay H to positive. The contact $h_\mathrm{II}$ is closed and establishes a current circuit to the brushes $b_\mathrm{I}$ and $b_\mathrm{II}$ below which at this time is the space between the item cards. Accordingly, all brushes are directly on the contact plates and feed the current to the accumulator clutch magnets, which respond temporarily and clutch all accumulator elements for the analysis or for zeroizing, respectively, as has been mentioned above. The contact $h_\mathrm{III}$ shifts to the selector magnets W which are plugged on the accumulator analyzing contacts $z$. The contact $h_\mathrm{IV}$ is shifted and interrupts the current circuit of the magnet clutch $K^1$ and the holding circuit to the group control relay G so that the latter are deenergized and the item card feed is stopped. The first item card is consequently stopped shortly before reaching the analyzing brushes $b_\mathrm{II}$.

By shifting of the contact $h_\mathrm{IV}$ the current circuit is established to the auxiliary relay V which responds and with its contacts prepares for total taking. It actuates the contacts $v_\mathrm{I}$ to $v_\mathrm{IV}$. The contact $v_\mathrm{I}$ is closed and connects the selector magnets with the plus-conductor so that the latter magnets can only operate now. The contact $v_\mathrm{II}$ is also closed and establishes the current circuit through the magnet clutch $K^2$, which engages the summary card feed so that the first blank card from the magazine 13 is fed to the feed rollers 27. Simultaneously therewith analysis of the accumulator and transfer of the accumulator setting to the selector magnets is effected, which magnets respond so that their associated punches are depressed by means of the punching yoke. This, however, has no influence on the perforation of cards since there is not yet any card below the punching device. The contact $v_\mathrm{III}$ is opened and interrupts therewith the current circuit to the brushes which circuit had been established shortly before by the contact $h_\mathrm{II}$. Consequently, only a short current impulse flows through the brushes $b_\mathrm{II}$ which, however, is sufficient for engaging of the accumulator magnets. The contact $v_\mathrm{IV}$ is closed, but has no influence on the operation of the machine since this contact is short-circuited through the contact $f^1$.

Shortly after the beginning of the analysis of the accumulators, the cam contact $s^2$ closes, thus establishing the current circuit to the magnet A which effects zeroizing, as described above. Current flows from the contact $f^1$ through the contacts $s^1$, the closed contacts $h_I$ and $s^2$ through the magnet A to positive. During the movement of the card to the punching device the cam contact $s^3$ closes which latter establishes a current circuit to the relay V so that the latter remains energized when the relay H is deenergized and the contact $h_{IV}$ shifts again. Shortly before the blank card has reached the punching device the cam contact $s^1$ opens temporarily thereby interrupting the holding circuit to the relay H so that the latter is deenergized and its contacts $h_I$ to $h_{IV}$ return to the initial position.

The contact $h_{III}$ shifts herein the current circuit again to the analyzing brushes. The contact $h_{IV}$ shifts also, thereby establishing the current circuit to the magnet clutch $K^1$ which responds and initiates the item card feed. Shifting of the contact $h_{IV}$ has no influence on the relay V since a second current circuit has been established through the cam contact $s^3$ to the relay, as has been mentioned above.

Now, at the same time the first item card passes under the analyzing brushes $b_{II}$ and the blank card under the punching device. At the same time the second item card is under the analyzing brushes $b_I$. During the following operating cycle, the cam contact $p^1$ closes and during the analysis of the various positions, the impulse contact $i$ closes so that corresponding to the individual perforations in the card, impulses are conducted from the brushes $b_{II}$ to the accumulator magnets $Zk$ and the punch selector magnets W. Accordingly, at the same time transfer of data to the accumulator and to the blank card, into which latter the constant data of the group of item cards to be transferred are punched, such as group number or name.

If the group number of the following item card is identical with that of the first one, the group control does not respond since current always flows at the same time through both windings of the relays.

With the beginning of the item card feed the cam contact $p^2$ has been opened again so that on responding of the group control and closing of one of the contacts $g_{III}$ the relay H cannot respond at once but only after the analyzing cycle has been added.

As soon as the analysis of the first item card and therewith the transfer to the blank card has been finished, the cam contact $s^3$ opens thereby interrupting the holding circuit to the relay V, and the latter is deenergized and its contacts $v_I$ to $v_{IV}$ return to the initial position. The contact $v_I$ is opened and interrupts therewith the current circuit through all selector magnets W so that the latter cannot respond during the next analyzing cycles. The contact $v_{II}$ is also opened and interrupts the current circuit through the magnet clutch $K^2$ so that the latter is deenergized and disconnects the summary card feed.

After analysis of the first item card the cam contact $p^1$ opens thereby avoiding further transfers. Now the second item card is fed to the analyzing brushes $b_{II}$. Shortly before the start of the analysis, the contact $p^1$ closes again so that the current circuit to the brushes is closed and transfer of the punched values to the accumulator elements may be effected. This operation is repeated until the group control detects a card having a different group number. In this instance the card under the brushes $b_I$ has another group perforation than the card under the brushes $b_{II}$. Current does no longer flow through both windings of one or several group control relays simultaneously, but only through one, so that the latter respond and actuate their contacts $g_I$ to $g_{III}$. The current circuit for the relay H is again prepared through the contacts $g_{III}$ which relay responds at the end of the analysis and therewith initiates total taking as has been already described above.

If one of the card receivers is filled one of the contacts $m^1$ or $m^2$ is opened thereby interrupting the current circuit through the entire machine and stopping the latter. After the magazine has been cleared the contact $m^1$ or $m^2$ closes again and the machine continues running automatically. The same applies to the contacts $f^1$ and $f^2$ of the supply magazines, but the latter open if there is no card left in one of the magazines. If cards are again supplied, the contact $f^1$ or $f^2$ closes and establishes again the current circuit through the machine.

When the item card magazine is emptied and if no longer cards are to be supplied since the operating run is finished, the contact $e$ is closed by a key and therewith the current circuit through the machine is established. When the last card has left the analyzing brushes $b_I$ all brushes $b_I$ encounter the contact plate. Since there is still a card under the brushes $b_{II}$ the group control relays G respond thereby energizing one after the other the relay H and through the latter the relay V as has been described above. If the relay V has responded it closes its contact $v_{IV}$. Now the key for the contact $e$ may again be released. The current circuit is, however, no longer interrupted since it is maintained by the contact $v_{IV}$. The relay V remains energized until total taking is finished. Accordingly, the machine runs automatically so long until the last blank card has been completely punched and has been deposited as summary card in the magazine 14. After total taking has been finished the relay V is deenergized on account of the cam contact $s^3$. The contact $v_{IV}$ opens and interrupts the entire current circuit through the machine so that the latter is stopped.

I claim:

1. In a card controlled machine, in combination, an analyzer device for analyzing group designation marks and item marks in groups of item cards fed thereto and adapted to detect a change in the group designation marks of the item cards and thereby to detect the first and last card of each group of item cards; accumulator means controlled by said analyzer device for computing the result of data represented by item marks on groups of said item cards analyzed by said analyzer device; and punching means for punching special cards fed thereto, said punching means being controlled by said analyzer device to punch into each special card the group designation mark sensed by said analyzer device when the same analyzes the first card of each group of item cards, and being controlled by said accumulator means to punch into the respective special card the result computed by said accumulator means after said analyzer device has sensed the last card of a group of item cards.

2. In a card controlled machine, in combination, a group control mechanism including, first analyzing means for analyzing group designation marks in groups of item cards fed thereto and adapted to detect a change in the group designation marks of the item cards and thereby to detect the first and last card of each group of item cards; second analyzing means for analyzing said item cards, and adapted to analyze item marks on said item cards representing data; accumulator means controlled by said second analyzing means for computing the result of data represented by item marks on groups of said item cards analyzed by said second analyzing means; and punching means for punching special cards fed thereto, said punching means being controlled by said second analyzing means to punch into each special card the group designation mark sensed by said second analyzing means when the same analyzes the first card of each group of item cards, and being controlled by said accumulator means to punch into the respective special card the result computed by said accumulator means after said second analyzing means has sensed the last card of a group of item cards.

3. In a card controlled machine, in combination, punching means for punching special cards fed thereto; a shifting device for shifting said punching means and a special card fed thereto relative to each other and being movable between an inoperative position and an operative position in which the special card is under said punching means;

accumulator means controlling said punching means; an analyzer device for analyzing group designation marks and item marks in groups of item cards fed thereto and adapted to detect a change in the group designation marks of the item cards and thereby to detect the first and last card of each group of item cards, said analyzer device controlling said accumulator means to compute the result of data represented by item marks on groups of said item cards analyzed by said analyzer device, said analyzer device controlling said shifting device to move to said operative position when said analyzer device senses the first and last cards of each group of item cards and to move to said inoperative position during the passage of other item cards through said analyzer device, said analyzer device actuating said punching means to punch into each special card the group designation mark sensed by said analyzer means in the first card of each group of cards, and controlling said punching means and actuating the same to punch into the respective special card the result computed by said accumulator means after said analyzer device has sensed the last card of a group of item cards.

4. In a card controlled machine, in combination, punching means for punching special cards fed thereto; a shifting device for shifting said punching means and a special card fed thereto relative to each other and being movable between an inoperative position and an operative position in which the special card is under said punching means; accumulator means controlling said punching means; an analyzer device including first analyzing means for analyzing group designation marks in groups of item cards fed thereto and adapted to detect a change in the group designation marks of the item cards and thereby to detect the first and last card of each group of item cards, said analyzer device also including second analyzing means for analyzing said item cards and adapted to analyze item marks on said item cards representing data, said second analyzing means controlling said accumulator means to compute the result of data represented by item marks on groups of said item cards analyzed by said second analyzing means, said first analyzing means controlling said shifting device to move to said operative position when said first analyzing means senses the first card of each group of item cards and to move to said inoperative position during the passage of other item cards through said analyzer device, said analyzer device actuating said punching means to punch into each special card the group designation mark sensed by said second analyzing means in the first card of each group of cards, and controlling said punching means and actuating the same to punch into the respective special card the result computed by said accumulator means after said second analyzing means has sensed the last card of a group of item cards.

5. In a card controlled machine, in combination, punching means for punching special cards fed thereto; a card shifting device for shifting a special card fed to said punching means and being movable between an inoperative position in which the special card is located outside of said punching means and an operative position in which the special card is under said punching means; accumulator means controlling said punching means; an analyzer device including first analyzing means for analyzing group designation marks in groups of item cards fed thereto and adapted to detect a change in the group designation marks of the item cards and thereby to detect the first and last card of each group of item cards, said analyzer device also including second analyzing means for analyzing said item cards and adapted to analyze item marks on said item cards representing data, said second analyzing means controlling said accumulator means to compute the result of data represented by item marks on groups of said item cards analyzed by said second analyzing means, said first analyzing means controlling said shifting device to move to said operative position when said first analyzing means senses the first card of each group of item cards and to move to said inoperative position during the passage of other item cards through said analyzer device, said analyzer device actuating said punching means to punch into each special card the group designation mark sensed by said second analyzing means in the first card of each group of cards, and controlling said punching means and actuating the same to punch into the respective special card the result computed by said accumulator means after said second analyzing means has sensed the last card of a group of item cards.

6. An apparatus as claimed in claim 5 wherein said punching means is a single row of punches, each punch adapted to punch a column on a special card, said row of punches being adapted to simultaneously punch adjacent columns position by position.

7. An apparatus as claimed in claim 5 wherein said card shifting device under control of said first analyzing means moves in one direction to said inoperative position after said punching means have punched the group designation mark into a special card in said operative position, and moves in an opposite direction from said inoperative position to said operative position for shifting the special card into position to be punched according to the result obtained from said accumulator means after the last card of the group of item cards has been sensed by said second analyzing means.

8. An apparatus as claimed in claim 7 wherein said card shifting device includes rotary feed roller means.

9. In a card controlled machine, in combination, punching means for punching special cards fed thereto; combined card feeding and shifting means for supplying special cards to said punching means, said combined feeding and shifting means being movable in one direction to an operative position in which the special card is located under said punching means and from there to an inoperative position in which the special card is spaced from said punching means, and being movable in an opposite direction from said inoperative position back to said operative position; driving and reversing means for reversing the direction of movement of said combined card feeding and shifting means and for driving the same; accumulator means controlling said punching means; an analyzer device including first analyzing means for analyzing group designation marks in groups of item cards fed thereto and adapted to detect a change in the group designation marks of the item cards and thereby to detect the first and last card of each group of item cards, said analyzer device also including second analyzing means for analyzing said item cards and adapted to analyze item marks on said item cards representing data, said second analyzing means controlling said accumulator means to compute the result of data represented by item marks on groups of said item cards analyzed by said second analyzing means, said first analyzing means controlling said driving and reversing means to move said combined card feeding and shifting means to said operative position in said one direction for feeding a special card to said punching means when said second analyzing means senses the first card of a group of item cards and thereupon to move to said inoperative position, said first analyzing means also controlling said driving and reversing means to move said combined card feeding and shifting means back from said inoperative position to said operative position when said first analyzing means senses the last card of a group of item cards, said analyzer device actuating said punching means to punch into each special card the group designation mark sensed by said second analyzing means in the first card of each group of cards, and controlling said punching means and actuating the same to punch into the respective special card the result computed by said accumulator means after said second analyzing means has sensed the last card of a group of item cards.

10. An apparatus as claimed in claim 9 wherein said combined card feeding and shifting means include first feed roller means and second feed roller means, and means connecting said first and second feed roller means for rotation in opposite directions, the arrangement being such that said first feed roller means feed a special card to said second feed roller means during rotation in one direction, and that said second feed roller means grip a special card fed thereto after direction of rotation has been reversed, and move from said operative position to said inoperative position, and then after reversal of the direction of rotation back to said operative position.

11. An apparatus as claimed in claim 9, wherein said driving and reversing means include reversing means comprising a gear means rotating in one direction; and a reciprocably mounted plate member formed with an elongated slot bounded by edges having gear teeth engaged by said gear means so that during rotation of said gear means said edges move relative to said gear means and said plate member is reciprocated.

12. An apparatus as claimed in claim 11 wherein the ratio between the number of gear teeth of said plate member and the number of gear teeth of said gear means is so selected that said plate member returns to its initial position after said combined card feeding and shifting means have completed an operational cycle during which a special card is fed and punched.

13. An apparatus as claimed in claim 9 and including deflector means arranged in the region of said combined card feeding and shifting means; and wherein said combined card feeding and shifting means are adapted for moving a special card after return movement from said inoperative to said operative position further and toward said deflector means; and card receiving means for receiving cards deflected by said deflector means.

14. In a record card control summary punch, in combination, analyzing means for analyzing group designations and item data of cards fed thereto; accumulator means under the control of said analyzing means; feeding means for feeding said cards one by one to said analyzing means; a group control mechanism including said designation data analyzing means for detecting a change in the group designations of said cards; a punching mechanism for said cards; means called into action by said group control mechanism for controlling said punching mechanism by said group designation analyzing means upon the presentation of the first card of a group to said designation analyzing means; and total taking means also called into action by said group control mechanism upon a group change to control said punching mechanism by said accumulator means after the item data of the last card of a group have been entered into said accumulator means.

15. In a record card controlled summary punch, in combination, analyzing means for analyzing group designations and item data of item cards; accumulator means under the control of said item data analyzing means; means for feeding said item cards one by one to said analyzing means; a group control mechanism including said designation data analyzing means for detecting a change in the group designations of said item cards; a punching mechanism for summary cards; means called into action by said group control mechanism for controlling said punching mechanism by the group designation analyzing means upon the presentation of the first card of a group to said designation analyzing means; and total taking means also called into action by said group control mechanism upon a group change to control said punching mechanism by said accumulator means after the item data of the last card of a group have been entered in said accumulator means.

16. In a record card controlled summary punch, in combination, analyzing means for analyzing group designations and item data of item cards; accumulator means under the control of said item data analyzing means; means for feeding said item cards index position-by-index position and one by one to said analyzing means; a group control mechanism including said designation data analyzing means for detecting a change in the group designations of said item cards; a punching mechanism for summary cards including a single row of punches; feeding means for feeding summary cards index position-by-index position past said row of punches and synchronous with the index position-by-index position analysis of said item cards, and for again feeding each summary card in a reversed direction index position-by-index position past said row of punches synchronous with the analysis of said accumulator means; means called into action by said group control mechanism for controlling said punches of punching mechanism by the group designation analyzing means upon the presentation of the first card of a group to said designation analyzing means; and total taking means also called into action by said group control mechanism upon a group change to control said punches of said punching mechanism by said accumulator means after the item data of the last card of a group have been entered in said accumulator means.

17. In a record card controlled summary punch, in combination, analyzing means for analyzing group designations and item data of item cards; accumulator means under the control of said item data analyzing means; means for feeding said item cards index position-by-index position and one by one to said analyzing means; a group control mechanism including said designation data analyzing means for detecting a change in the group designations of said item cards; a punching mechanism for summary cards feeding means for feeding summary cards index position-by-index position past said punching mechanism synchronous with the index position-by-index position analysis of said item cards, and for again feeding each summary card in a reversed direction index position-by-index position past said punching mechanism synchronous with the analysis of said accumulator means; means called into action by said group control mechanism for controlling said punching mechanism by the group designation analyzing means upon the presentation of the first card of a group to said designation analyzing means; and total taking means also called into action by said group control mechanism upon a group change to control said punching mechanism by said accumulator means after the item data of the last card of a group have been entered in said accumulator means.

References Cited in the file of this patent

UNITED STATES PATENTS 2,195,851    Daly et al. _____ Apr. 2, 1940